United States Patent Office 3,787,455
Patented Jan. 22, 1974

---

3,787,455
VINYL CHLORIDE PLASTIC COMPOSITIONS AND CERTAIN PLASTICIZERS THEREFOR
Robert R. Mod, Frank C. Magne, and Evald L. Skau, New Orleans, La., assignors to the United States of America as represented by the Secretary of Agriculture
No Dawing. Application Nov. 13, 1969, Ser. No. 876,556, now Patent No. 3,644,478, which is a division of application Ser. No. 683,060, Oct. 12, 1967, now abandoned, which in turn is a division of application Ser. No. 529,652, Feb. 24, 1966, now Patent No. 3,403,126. Divided and this application May 7, 1971, Ser. No. 141,361
Int. Cl. C07c 103/30
U.S. Cl. 260—404                                     5 Claims

ABSTRACT OF THE DISCLOSURE

The invention provides an N-alkyl-N-2-acetoxyethyl-oleamide wherein the alkyl group contains from 1–4 carbon atoms, which is useful as a plasticizer for vinyl chloride resins.

---

A non-exclusive, irrevocable, royalty-free license in the invention herein described, throughout the world for all purposes of the United States Government, with the power to grant sublicenses for such purposes, is hereby granted to the Government of the United States of America.

This application is a division of application bearing Ser. No. 876,556, filed Nov. 13, 1969, now U.S. Pat. 3,644,478, in which, in turn is a division of application bearing Ser. No. 683,060, filed Oct. 12, 1967, now abandoned, and which, in turn, is a division of application bearing Ser. No. 529,652, filed Feb. 24, 1966, now U.S. Pat. No. 3,403,126.

This invention relates to certain compounds which are N-acyl derivatives of symmetrical or asymmetrical secondary amines, to some unique mixtures of the same, and to plastic compositions, the plasticizer component of which is at least one of the compounds or unique mixtures that are the subject of this invention. More particularly, this invention relates to N,N-disubstituted long-chain aliphatic amides wherein the acyl component of which if saturated is an alkanoic acyl containing from 10 to 18 carbon atoms, and if unsaturated is a monoalkenoic acyl containing from 18 to 22 carbon atoms, the amide nitrogen in all cases being the nitrogen atom of a symmetrical or asymmetrical secondary, acyclic or alicyclic amine, said secondary amine being a substituted or unsubstituted acyclic or alicyclic amine.

Specifically this invention relates to symmetrical and asymmetrical N,N-dialkyl amide plasticizers wherein the total number of carbon atoms in the two alkyl groups is from 5 to about 14; to asymmetrical N,N-disubstituted amide plasticizers wherein one of the substituents on the amide nitrogen is an alkyl group containing from 1 to 4 carbon atoms and the other is a radical chosen from the group consisting of allyl, 2,3-epoxypropyl, an alicyclic hydrocarbon radical containing from 5 to 12 carbon atoms, benzyl, furfuryl, tetrahydrofurfuryl, 2-acetoxyethyl, 2-methoxyethyl, 2-ethoxyethyl, 2-ethoxypropyl and 2-cyanoethyl; and to asymmetrical N,N-disubstituted amide plasticizers wherein the substituents on the amide nitrogen are selected from the group benzyl, cyclohexyl, 2-acetoxyethyl, and 2-cyanoethyl. This invention also relates to certain other new amide plasticizers wherein the acyl component is derived from epoxyalkanoic or epoxyalkenoic acids, from monoalkyl esters of pinic acid, from branched chain or neo acids, or from long-chain acyl derivatives of short-chain hydroxy acids.

More specifically this invention relates to compounds and mixtures of compounds that are good, compatible, solvent-type plasticizers for vinyl chloride resins; moreover the compounds and mixtures of this invention are efficient, primary, solvent-type plasticizers which can be made from low-price fatty acids and which exhibit good compatibility with the impart not only low volatility loss, resistance to microbial action, excellent low-temperature properties (low brittle points), and stability against northern light exposure, but also excellent thermal stability and antistatic properties to vinyl chloride polymer and copolymer resins.

A polyvinyl chloride resin, being a hydrophobic resin, differs from hydrophilic resins such as cellulose esters, cellulose acetate, cellulose nitrate, and polyvinyl acetal resins in two important respects; (1) It tends to develop static charges on its surface due to frictional forces during manufacture or in everyday use of the plastic products. This results in (a) the attraction of dust and lint to the plastic surface, (b) the tendency of one surface or film to adhere to another, and (c) in general, interference with efficient manufacture and with consumer acceptance of the finished product. For example, a static charge may be developed by the friction of one's clothing on an automobile plastic seat cover and may even result in a slight but unpleasant spark or shock when the passenger grounds himself or alights. (2) Polyvinyl chloride tends to undergo decomposition on extended exposure to even moderately elevated temperatures, resulting in darkening and development of discoloration. Different palsticizers affect the stability of the polyvinyl chloride to different degrees, some impair and others improve the thermal stability.

Although antistatic properties may be imparted to a surface, at least temporarily, by spraying on or coating with a film of an antistatic agent, the antistatic properties imparted have limited permanence and are lost as the film is worn or washed away. It is much more advantageous, both from the point of view of performance and of eliminating need for the spraying or coating operation, to use an antistatic agent which is a compatible plasticizer, which can be used as the sole plasticizer, and which when so incorporated in the plastic compositions still retains and exhibits its antistatic properties.

It is known that N,N-dimethyl-oleamide is an efficient, primary, low-temperature plasticizer for polyvinyl chloride resins. This compound is also known to possess antistatic properties. We have discovered, in addition, that when N,N-dimethyl-olemide is used as the plasticizer in polyvinyl chloride resin the plasticized stock also has excellent antistatic properties. However, polyvinyl chloride resin plasticized with N,N-dimethyl-oleamide exhibits extremely poor thermal stability and therefore it cannot be used for commercial applications involving exposure to even moderately elevated temperatures, such, for example, as would be encountered in a closed automobile in summer weather.

It was disclosed by Dazzi in U.S. Pat. 2,875,218 that the N,N,N',N'-tetramethyl and N,N,N',N'-tetra-n-butyl diamides of dimeric linoleic acid are plasticizers for polyvinyl chloride resins. We have found that N,N,N',N'-tetra-n-butyl diamide of dimeric linoleic acid has excellent antistatic properties. However, polyvinyl chloride resin plasticized with this diamide has no antistatic properties and has the added disadvantage that it exhibits poor thermal stability.

We have made the surprising discovery that when certain of the compounds of this invention are used as plasticizers for polyvinyl chloride resins the plasticized resin possesses both excellent antistatic properties and excellent thermal stability.

The terms "vinyl type resin" and "vinyl chloride resin" are used throughout this specification and claims to refer to homopolymers and copolymers of monomers containing vinyl chloride in a predominant proportion by weight.

Terms such as "compatible," "good compatibility," and "compatible plasticizer" in reference to the plasticizers which are the subject of this invention are used throughout the specification to refer to plasticizers that show no sign of exudation, migration to the surface, for at least 30 days when the plasticizers are present in the resin in proportion of about 70 parts by weight of plasticizer to 100 parts by weight of resin.

If a resin is plasticized with a compound with which it has only limited compatibility, the plasticizer soon exudes or migrates to the surface unless the plasticizer is used either in a limited amount or is used in conjunction with a mutual solvent (a compatible auxiliary plasticizer) to obtain adequate compatibility.

It is known in the art that compounds similar to some of those which are the subject of this invention exhibit reasonably good compatibility for hydrophilic-type resins but in order to obtain adequate flexibility must be employed together with a secondary or an auxiliary plasticizer as those shown, for example, in U.S. Pat. No. 2,339,056.

It would be expected from the recognized compatibility of certain compounds related to types herein described with polyvinyl acetals (hydrophilic-type resins), that these compounds would be quite incompatible with polymers of the vinyl chloride type. Certain of the particular compounds and compound mixtures herein described are, however, compatible as primary plasticizers with vinyl chloride resins and, as we note above, they are compatible with the hydrophilic-type resins as well.

Not only are the particular compounds and mixtures of compounds herein described compatible vinyl-type resin plasticizers, but the instant invention is considerably broader in that it also contemplates the use of compatible binary, ternary, or multiple component mixtures of N,N-disubstituted amides of mixed saturated, monounsaturated, and polyunsaturated acids such as can be derived from animal, fish, or vegetable fats and oils such as tallows, white greases, menhaden oil, cottonseed oil, soybean oil. rapeseed oil, safflower oil, Crambe abyssinica seed oil, jojoba oil, parsley seed oil, Limnanthes douglasii seed oil, palm oil, Vernonia anthelmintica seed oil, castor oil, foots, or from tall oil acids or rosin acids, and other seed oils.

The N-acyl derivatives of this invention decrease in their degree of compatibility as the alkyl portion of the acyl group (if saturated) increases in chain length beyond 15 carbon atoms and they are incompatible when the chain length is 17 or more carbon atoms. In general, the compatibility of a mixture of these N-acyl derivatives of secondary amines containing a considerable proportion of these less compatible or incompatible N-acyl derivatives can be improved by mixing with a compatible plasticizer or by reducing the proportion of the incompatible saturated constituents by such procedures as fractional distillation or fractional crystallization either before or after the amidation step in the preparation of the N-acyl secondary amine mixture. Similarly, the N-acyl derivatives of this invention decrease in their degree of compatibility as the alkyl portion of the acyl group of the N-acyl derivative (if unsaturated) increases in unsaturation beyond monounsaturation. In general, the compatibility of such a polyunsaturated derivative or of a mixture of N-acyl secondary amines some of which contain such a polyunsaturated acyl can be increased by mixing with a suitable amount of a compatible plasticizer or by decreasing the proportion of the polyunsaturated constituent either by physical means, such as fractionation, or by chemical means such as selective hydrogenation, cyanoethylation, halogenation, epoxidation, formylation, maleination, or the like either before or after the amidation step in the preparation of the N-acyl secondary amine or N-mixed-acyl secondary amine. The specific component ratio of compatible compositions can be established according to the scheme set forth in our copending application Ser. No. 334,685 filed Dec. 10, 1963, for example.

The preferred N,N-dialkylamides of this invention are those in which each of the alkyl substituents on the amide nitrogen contains two or more carbon atoms and the total number of carbons in the two alkyl groups is from 6 to 14. The preferred asymmetrically N,N-disubstituted amides of this invention having one alkyl substituent on the amide nitrogen are those in which the alkyl group contains two or more carbon atoms and the total number of carbons in the two substituents is less than about 14.

The compounds that are the subject of this invention are conveniently prepared by reacting the appropriate secondary amine with the appropriate acid, or corresponding acid chloride. In any event, methods for preparing compounds such as those described herein are well known to those skilled in the art of fatty acid chemistry. The details of individual preparations are listed in the following operating example. These examples are set forth by way of illustration and it will be understood tha the invention is not to be construed as limited to these compounds or by the details therein. Analyses are in weight percent.

EXAMPLE 1

N,N-di-n-propyl-oleamide 20 grams (0.20 mole) of di-n-propylamine and 15.6 grams (0.20 mole) of pyridine were dissolved in 150 ml. of benzene and 59.5 grams (0.20 mole) of oleoyl chloride were added dropwise with stirring. After stirring for an additional hour the reaction was filtered, washed successively with dilute hydrochloric acid and water, and dried over anhydrous sodium sulfate. Free acid was removed by percolating the benzene solution through a column of activated alumina and eluting the amide with a 1:1 ethanol-benzene mixture. The solvent was then removed by stripping under reduced pressure. Analysis of the product, N,N-di-n-propyl-oleamide: percent C, 78.82 (theory 78.86); percent H, 12.98 (theory 12.98); percent N, 3.64 (theory 3.63).

EXAMPLE 2

N,N-di-isopropyl-oleamide

This compound was prepared by the procedure of Example 1, from 11.9 grams (0.12 mole) of diisopropylamine, 35 grams (0.12 mole) of oleoyl chloride, and 9.2 grams (0.12 mole) of pyridine. Analysis of the product, N,N-di-isopropyl-oleamide: percent C, 76.87 (theory 78.76); percent H, 12.69 (theory 12.96); percent N, 3.56 (theory 3.83).

EXAMPLE 3

N,N-di-n-butyl-oleamide

A mixture of 27.5 grams (0.21 mole) of di-n-butylamine, 40 grams (0.14 mole) of oleic acid, and 20 milliliters of benzene was refluxed in an apparatus equipped with a Dean-Stark trap until the evolution of water ceased. The mixture was diluted with 150 ml. of commercial hexane, washed successively with dilute hydrochloric acid and water, and dried over anhydrous sodium sulfate. Free acid was removed by percolating the hexane solution through a column of activated alumina, and eluting the amide with 1:1 hexane-ethanol mixture. The solvent was removed by stripping under reduced pressure. Analysis of the product, N,N-di-n-butyl-oleamide: percent C, 78.94 (theory 79.25); percent H, 13.16 (theory 13.06); percent N, 3.44 (theory 3.56).

EXAMPLE 4

N,N-di-sec-butyl-oleamide

This compound was prepared by the procedure of Example 1 from 20 grams (0.15 mole) of di-sec-butylamine, 46.6 grams (0.15 mole) of oleoyl chloride, and 12.3 grams (0.15 mole) of pyridine. Analysis of the product N,N-di-sec-butyl-oleamide: percent C, 79.04 (theory 79.27); percent H, 13.38 (theory 13.06); percent N, 2.94 (theory 3.56).

EXAMPLE 5

N,N-di-isobutyl-oleamide

This compound was prepared by the producedure of Example 1, from 15 grams (0.12 mole) of diisobutylamine, 35 grams (0.12 mole) of oleoyl chloride and 9.2 grams (0.12) of pyridine. Analysis of the product, N,N-di-isobutyl-oleamide: percent C, 78.78 (theory 79.25); percent H, 13.10 (theory 13.06); percent N, 3.56 (theory 3.56).

EXAMPLE 6

N,N-di-n-amyl-oleamide

This compound was prepared by procedure of Example 1, from 18.3 grams (0.12 mole) of di-n-amylamine, 35 grams (0.12 mole) of oleoyl chloride and 9.3 grams (0.12 mole) of pyridine. Analysis of the product, N,N-di-n-amyl-oleamide: percent C, 79.68 (theory 79.81); percent H, 13.28 (theory 13.15); percent N, 3.29 (theory 3.32).

EXAMPLE 7

N,N-di-isoamyl-oleamide

This compound was prepared by the procedure of Example 1, from 19 grams (0.12 mole) of di-isoamylamine, 38.3 grams (0.12 mole) of oletoyl chloride and 9.6 grams (0.12 mole) of pyridine. Analysis of the product, N,N-di-isoamyl-oleamide: percent C, 78.90 (theory 78.78); percent H, 13.14 (theory 13.15); percent N, 3.25 (theory 3.32).

EXAMPLE 8

N,N-di-2-amyl-oleamide

This compound was prepared by the procedure of Example 1, from 19 grams (0.12 mole) of di-2-amylamine, 38.3 grams (0.12 mole) of oleoyl chloride and 9.6 grams (0.12 mole) of pyridine. Analysis of the product, N,N-di-2-amyl-oleamide: percent C, 79.34 (theory 79.69); percent H, 12.84 (theory 13.14); percent N, 3.46 (theory 3.32).

EXAMPLE 9

N,N-di-n-hexyl-oleamide

This compound was prepared by the procedure of Example 1 from 30 grams (0.16 mole) of di-n-hexylamine, 48.7 grams (0.16 mole mole) of oleoyl chloride and 12.8 grams (0.16 mole) of pyridine. Analysis of the product, N,N-di-n-hexyl-oleamide: percent C, 80.11 (theory 80.09); percent H, 13.45 (theory 13.23); percent N, 3.15 (theory 3.12).

EXAMPLE 10

N,N-di-n-heptyl-oleamide

This compound was prepared by the procedure of Example 1 from 21.3 grams (0.10 mole) of di-n-heptylamine, 30 grams (0.10 mole) of pyridine. Analysis of the product, N,N-di-n-heptyl-oleamide: percent C, 80.03 (theory 80.36); percent H, 13.34 (theory 13.31); percent N, 2.86 (theory 2.93).

EXAMPLE 11

N,N-di-n-octyl-oleamide

This compound was prepared by the procedure of Example 1, from 24.1 grams (0.10 mole) of di-n-octylamine, 30 grams (0.10 mole) of oleoyl chloride, and 7.9 grams (0.10 mole) of pyridine. Analysis of the product, N,N-di-n-octyl-oleamide: percent C, 80.58 (theory 80.65); percent H, 13.39 (theory 13.35); percent N, 2.72 (theory 2.77).

EXAMPLE 12

N,N-di-2-ethylhexyl-oleamide

This compound was prepared by the procedure of Example 1, from 24.1 grams (0.10 mole) of di-2-ethylhexylamine, 30 grams (0.10 mole) of oleoyl chloride and 7.9 grams (0.10 mole) of pyridine. Analysis of the product, N,N-di12-ethylhexyl-oleamide: percent C, 79.80 (theory 80.65); percent H, 13.25 (theory 13.24); percent N, 2.90 (theory 2.77).

EXAMPLE 13

N,N-di-n-decyl-oleamide

This compound was prepared by the procedure of Example 1, from 22.7 grams (0.08 mole) of di-n-decylamine, 23 grams (0.08 mole) of oleoyl chloride, and 6.1 grams (0.08 mole) of pyridine. Analysis of the product, N,N - di - n - decyl-oleamide: percent C, 81.01 (theory 81.13); percent H, 13.37 (theory 13.45; percent N, 2.43 (theory 2.49).

EXAMPLE 14

N,N-di-n-butyl-2-ethylhexanamide

This compound was prepared by the procedure of Example 2, from 27.8 grams (0.22 mole) of di-n-butylamine, 35 grams (0.22 mole) of 2-ethylhexanoyl chloride, and 17.0 grams (0.22 mole) of pyridine. Analysis of the product, N,N-di-n-butyl-2-ethylhexanamide: percent C, 74.97 (theory 75.16), percent H, 12.84 (theory 12.92); percent N, 5.15 (theory 5.48).

EXAMPLE 15

N,N-di-n-butyl-neodecanamide

This compound was prepared by the procedure of Example 1, from 26.1 grams (0.20 mole) of di-n-butylamine, 16 grams (0.20 mole) of pyridine and 40 grams (0.20 mole) of neodecanoyl chloride. Analysis of the product, N,N-di-n-butyl-neodecanamide: percent C, 76.10 (theory 76.19); percent H, 13.25 (theory 13.05); percent N, 4.90 (theory 4.94).

EXAMPLE 16

N,N-di-n-butyl-neotridecanamide

This compound was prepared by the procedure of Example 1, from 22.2 grams (0.17 mole) of di-n-butylamine, 40 grams (0.17 mole) of neotridecanoyl chloride and 13.6 grams (0.17 mole) of pyridine. Analysis of the product, N,N-di-n-butyl-neotridecanamide; percent C, 77.27 (theory 77.47); percent H, 13.26 (theory 13.22); percent N, 4.29 (theory 4.31).

EXAMPLE 17

N,N-di-n-butyl-palmitamide

This compound was prepared by the procedure of Example 3, from 30.2 grams (0.23 mole) of di-n-butylamine and 40 grams (0.16 mole) of palmitic acid. Analysis of the product, N,N-di-n-butyl-palmitamide: percent C, 78.75 (theory 78.33); percent H, 13.72 (theory 13.43); percent N, 4.04 (theory 3.81).

EXAMPLE 18

N,N-di-n-butyl-stearamide

This compound was prepared by the procedure of Example 3, from 28 grams (0.22 mole) of di-n-butylamine and 40 grams (0.14 mole) of stearic acid. Analysis of the product, N,N-di-n-butyl-stearamide: percent C, 78.86 (theory 78.85); percent H, 13.51 (theory 13.50); percent N, 3.49 (theory 3.54).

EXAMPLE 19

N,N-di-n-butyl-erucamide

This compound was prepared by the procedure of Example 3, from 22.8 grams (0.18 mole) of di-n-butylamine and 40 grams (0.12 mole) of erucic acid. Analysis of the product, N,N,di-n-butyl-erucamide: percent C, 79.99 (theory 80.03); percent H, 13.11 (theory 13.22); percent N, 3.07 (theory 3.09).

EXAMPLE 20

N,N-di-n-butyl-epoxystearamide

This compound was prepared by epoxidation of N,N-di-n-butyl-oleamide, using meta-chloroperbenzoic acid. The product, N,N-di-n-butyl-epoxystearamide had an oxirane oxygen content of 3.43%.

EXAMPLE 21

N,N-di-n-butyl-linoleamide

This compound was prepared by the procedure of Example 3, from 27.7 grams (0.21 mole) of di-n-butylamine and 40 grams (0.14 mole) of linoleic acid. Analysis of the product, N,N-di-n-butyl-linoleamide: percent C, 79.19 (theory 79.65); percent H, 12.71 (theory 12.61); percent N, 3.45 (theory 3.58).

EXAMPLE 22

N,N-di-n-butyl-ricinoleamide 50 grams (0.16 mole) of methyl ricinoleate and 41.4 grams (0.32 mole) of di-n-butylamine were refluxed at a temperature such that the methyl alcohol was removed without the distillation of the di-n-butylamine. The reaction was continued for 36 hours after which the product was cooled, dissolved in Skellysolve B, neutralized with dilute aqueous HCl and then water washed. The mixture was dried over anhydrous sodium sulfate, filtered and then stripped under reduced pressure. The impure amide was then distilled under 1 mm. pressure. Analysis of the product, N,N-di-n-butyl-richinoleamide: percent C, 76.32 (theory 76.15); percent H, 12.62 (theory 12.45); percent N, 3.34 (theory 3.42).

EXAMPLE 23

N,N-di-n-butyl-naphthenamide

This compound was prepared by the procedure of Example 3 from 35.7 grams (0.28 mole) of di-n-butylamine and 40 grams (0.18 mole) of naphthenic acid (neut. equiv. 217). The product, N,N-di-n-butyl-naphthenamide, had a nitrogen content of 4.20%.

EXAMPLE 24

N,N,N',N'-tetra-n-butyl diamide of dimeric linoleic acid

This compound was prepared by the procedure of Example 3, from 27.7 grams (0.21 mole) of di-n-butylamine and 40 grams (0.071 mole) of dimeric linoleic acid. The product, the N,N,N',N'-tetra-n-butyl diamine of dimeric linoleic acid, had a nitrogen content of 3.55% (theory 3.58%).

EXAMPLE 25

Ethyl-2,2-dimethyl-3(di-n-butylamino)carbonyl-cyclobutaneacetate

This compound was prepared by the procedure of Example 1, from 22.2 grams (0.17 mole) of di-n-butylamine, 40 grams (0.17 mole) of ethyl-2,2-dimethyl-3-chlorocarbonylcyclobutaneacetate, and 13.6 grams (0.17 mole) of pyridine. Analysis of the product, ethyl-2,2-dimethyl - 3(di - n - butylamino)carbonylcyclobutaneacetate: percent C, 70.11 (theory 70.09); percent H, 10.95 (theory 11.15); percent N, 4.14 (theory 4.30).

EXAMPLE 26

N,N-di-n-butyl amide of cottonseed fatty acids

This compound was prepared by the procedure of Example 3, from 24.6 grams (0.19 mole) of di-n-butylamine and 40 grams (0.15 mole) of cottonseed oil fatty acids. The product, the N,N-di-n-butyl amide of cottonseed fatty acids, had a nitrogen content of 3.26%.

EXAMPLE 27

N,N-di-n-butyl amide of selectively hydrogenated cottonseed fatty acids

This compound was prepared by the procedure of Example 3, from 28.2 grams (0.22 mole) of di-n-butylamine and 40 grams (0.14 mole) of selectively hydrogenated cottonseed oil fatty acids. (The selectively hydrogenated cottonseed oil fatty acids had an iodine value of 73.2, a thiocyanogen value of 68.0, and a neutralization equivalent of 274.) The product, N,N-di-n-butyl amide of selectively hydrogenated cottonseed fatty acids, had a nitrogen content of 3.63%.

EXAMPLE 28

N,N-di-n-butyl amide of rapeseed fatty acids

This compound was prepared by the procedure of Example 3, from 31.9 grams (0.25 mole) of di-n-butylamine and 50 grams (0.16 mole) of rapeseed oil fatty acids. The product, the N,N-di-n-butyl amide of rapeseed fatty acids, had a nitrogen content of 3.08%.

EXAMPLE 29

N,N-di-n-butyl amide of *Limnanthes douglasii* fatty acids

This compound was prepared by the procedure of Example 3, from 24.3 grams (0.19 mole) of di-n-butylamine and 40 grams (0.13 mole) of *Limnanthes douglasii* seed fatty acids. The product, N,N-di-n-butyl amide of *Limnanthes douglasii* fatty acids, had a nitrogen content of 3.23%.

EXAMPLE 30

N,N-di-n-butyl amide of animal acids

This compound was prepared by the procedure of Example 3, from 27.8 grams (0.22 mole) of di-n-butylamine, and 40 grams (0.15 mole) of animal acids. (The "animal acids" consisted of a mixture of fatty acids, having the following composition: 2% myristic, 26% palmitic, 16% stearic, 48% oleic, and 8% linoleic acids.) The product, N,N-di-n-butyl amide of animal acids, had a nitrogen content of 3.25%.

EXAMPLE 31

N,N-di-n-butyl amide of parsley seed fatty acids

This compound was prepared by the procedure of Example 3, from 30.5 grams (0.24 mole) of di-n-butylamine and 50 grams (0.16 mole) of parsely seed oil fatty acids. The produce, N,N-di-n-butyl amide of parsley seed fatty acids, had a nitrogen content of 3.08%.

EXAMPLE 32

N-methyl-N-propyl-oleamide

This compound was prepared by the procedure of Example 1, from 15 grams (0.20 mole) of N-methylpropyl-amine, 61.8 grams (0.21 mole) of oleoyl chloride and 16.3 grams (0.21 mole) of pyridine. Analysis of the product, N-methyl-N-propyl-oleamide: percent C, 77.57 (theory 78.23); percent H, 12.91 (theory 13.93); percent N, 3.97 (theory 4.15).

EXAMPLE 33

N-methyl-N-n-butyl-oleamide

This compound was prepared by the procedure of Example 1, from 11.6 grams (0.13 mole) of N-methylbutyl-amine, 10.5 grams (0.13 mole) of pyridine and 40 grams (0.13 mole) of oleoyl chloride. Analysis of the product, N-methyl-N-n-butyl-oleamide: percent C, 77.67 (theory 78.75); percent H, 12.88 (theory 12.94); percent N, 3.88 (theory 4.00).

EXAMPLE 34

N-methyl-N-n-amyl-oleamide

This compound was prepared by the procedure of Example 1, from 15 grams (0.15 mole) of N-methylamylamine, 44.6 grams (0.15 mole) of oleoyl chloride, and 11.7 grams (0.15 mole) of pyridine. Analysis of the product, N-methyl-N-n-amyl-oleamide: percent C, 78.76 (theory 78.80); percent H, 12.84 (theory 12.86); percent N, 3.86 (theory 3.83).

EXAMPLE 35

N-methyl-N-n-hexyl-oleamide

This compound was prepared by the procedure of Example 1, from 20 grams (0.17 mole) of N-methylhexylamine, 52.3 grams (0.17 mole) of oleoyl chloride and 13.8 grams (0.17 mole) pyridine. Analysis of the product, N-methyl-N-n-hexyl-oleamide: percent C, 78.99 (theory 79.06); percent H, 13.33 (theory 12.91); percent N, 3.52 (theory 3.69).

EXAMPLE 36

N-methyl-N-n-octyl-oleamide

This compound was prepared by the procedure of Example 1, from 20 grams (0.14 mole) of N-methyloctylamine, 42.1 grams (0.14 mole) of oleoyl chloride, 11.1 grams (0.14 mole) of pyridine. Analysis of the product, N-methyl-N-n-octyl-oleamide: percent C, 78.86 (theory 79.52); percent H, 13.03 (theory 13.01); percent N, 3.35 (theory 3.44).

EXAMPLE 37

N-methyl-N-n-dodecyl-oleamide

This compound was prepared by the procedure of Example 1, from 20 grams (0.10 mole) of N-methyldodecylamine, 33.1 grams (0.11 mole) of oleoyl chloride and 8.0 grams (0.10 mole) of pyridine. Analysis of the product, N-methyl-N-n-dodecyl-oleamide: percent C, 80.38 (theory 80.44); percent H, 13.99 (theory 13.79); percent N, 2.95 (theory 3.03).

EXAMPLE 38

N-methyl-N-allyl-oleamide

This compound was prepared by the procedure of Example 1, from 15 grams (0.21 mole) of N-methylallylamine, 63.5 grams (0.21 mole) of oleoyl chloride, and 16.7 grams (0.21 mole) of pyridine. Analysis of the product, N-methyl-N-allyl-oleamide: percent C, 77.68 (theory 78.70); percent H, 12.13 (theory 12.22); percent N, 4.21 (theory 4.18).

EXAMPLE 39

N-butyl-N-n-dodecyl-oleamide

This compound was prepared by the procedure of Example 1, from 20 grams (0.08 mole) of N-butyldodecylamine, 25 grams (0.08 mole) of oleoyl chloride and 6.6 grams (.08 mole) of pyridine. Analysis of the product, N-butyl-N-n-dodecyl-oleamide: percent C, 80.55 (theory 82.26); percent H, 13.53 (theory 13.61); percent N, 2.88 (theory 2.82).

EXAMPLE 40

N-butyl-N-propyl-oleamide

This compound was prepared by the procedure of Example 1, from 20 grams (0.18 mole) of N-butyl-N-propylamine, 54.8 grams (0.18 mole) of oleoyl chloride and 13.7 grams (0.18 mole) of pyridine. Analysis of the product N-butyl-N-propyl-oleamide: percent C, 78.59 (theory 79.16); percent H, 13.20 (theory 13.03); percent N, 3.69 (theory 3.69).

EXAMPLE 41

N-butyl-N-n-amyl-oleamide

This compound was prepared by tne procedure of Example 1, from 20 grams (0.14 mole) of N-butyl-N-amylamine, 44 grams (0.14 mole) of oleoyl chloride, and 11.1 grams (0.14 mole) of pyridine. Analysis of the product N-butyl-N-n-amyl-oleamide: percent C, 79.68 (theory 82.52); percent H, 12.96 (theory 13.11); percent N, 3.39 (theory 3.44).

EXAMPLE 42

N-methyl-N-cyclopentyl-oleamide

This compound was prepared by the procedure of Example 1, from 15 grams (0.15 mole) of N-methylcyclopentylamine, 45.5 grams (0.15 mole) of oleoyl chloride, and 12 grams (0.15 mole) of pyridine. Analysis of the product, N-methyl-N-cyclopentyloleamide: percent C, 77.77 (theory 79.54); percent H, 12.29 (theory 12.48); percent N, 3.84 (theory 3.86).

EXAMPLE 43

N-ethyl-N-cyclohexyl-oleamide

This compound was prepared by the procedure of Example 1, from 14.8 grams (0.12 mole) of N-ethylcyclohexylamine, 9.2 grams (0.12 mole) of pyridine and 35 grams (0.12 mole) of oleoyl chloride. Analysis of the product, N-ethyl-N-cyclohexyl-oleamide: percent C, 79.26 (theory 79.80); percent H, 12.52 (theory 12.53); percent N, 3.42 (theory 3.58).

EXAMPLE 44

N-isopropyl-N-cyclohexyl-oleamide

This compound was prepared by the procedure of Example 1, from 18.8 grams (0.13 mole) of N-isopropylcyclohexylamine, 40 grams (0.13 mole) of oleoyl chloride and 10.5 grams (0.13 mole) of pyridine. Analysis of the product, N-isopropyl-N-cyclohexyloleamide: percent C, 79.98 (theory 79.86); percent H, 12.70 (theory 12.57); percent N, 3.60 (theory 3.45).

EXAMPLE 45

N-methyl-N-cyclooctyl-oleamide

This compound was prepared by the procedure of Example 1, from 19 grams (0.13 mole) of N-methylcyclooctylamine, 40.5 grams (0.13 mole) of oleoyl chloride and 10.7 grams (0.13 mole) of pyridine. Analysis of the product, N-methyl-N-cyclooctyl-oleamide: percent C, 78.67 (theory 80.00); percent H, 12.60 (theory 12.69); percent N, 3.42 (theory 3.46).

EXAMPLE 46

N-methyl-N-cyclododecyl-oleamide

This compound was prepared by the procedure of Example 1, from 19 grams (0.10 mole) of N-methylcyclododecylamine, 31 grams (0.10 mole) of oleoyl chloride, and 7.6 grams (0.10 mole) of pyridine. Analysis of the product, N-methyl-N-cyclododecyl-oleamide: percent C, 80.81 (theory 80.69); percent H, 12.91 (theory 12.91); percent N, 3.03 (theory 3.04).

EXAMPLE 47

N-isopropyl-N-benzyl-oleamide

This compound was prepared by the procedure of Example 1, from 19.8 grams (0.12 mole) of N-benzylisopropylamine, 40 grams (0.13 mole) of oleoyl chloride and 10.5 grams (0.13 mole) of pyridine. Analysis of the product, N-isopropyl-N-benzyl-oleamide: percent C, 81.27 (theory 81.22); percent H, 11.61 (theory 11.36); percent N, 3.39 (theory 3.39).

EXAMPLE 48

N-methyl-N-furfuryl-oleamide

This compound was prepared by the procedure of Example 1, from 14.8 grams (0.13 mole) of N-methylfurfurylamine, 40 grams (0.13 mole) of oleoyl chloride and 10.5 grams (0.13 mole) of pyridine. Analysis of the product, N-methyl-N-furfuryl-oleamide: percent C, 76.55 (theory 76.68); perecnt H, 11.17 (theory 10.92); percent N, 3.81 (theory 3.73).

EXAMPLE 49

N-methyl-N-tetrahydrofurfuryl-oleamide

This compound was prepared by the procedure of Example 1, from 14.8 grams (0.12 mole) of N-methyltetrahydrofurfurylamine, 9.2 grams (0.12 mole) of pyridine and 35 grams (0.12 mole) of oleoyl chloride. Analysis of the product, N-methyl-N-tetrahydrofurfuryloleamide: percent C, 75.91 (theory 75.87); percent H, 11.83 (theory 12.22); percent N, 3.59 (theory 3.69).

EXAMPLE 50

N-methyl-N-2-acetoxyethyl-oleamide

Fifty grams (0.17 mole) of methyl oleate was slowly added to a vigorously stirred mixture of 13.4 grams (0.18 mole) of N-methylaminoethanol and 2.7 grams (0.12 mole) of metallic sodium dissolved in absolute methanol. The reaction was carried out with continued stirring at 65° to 75° C. and at 60 mm. pressure. The reaction was complete after all the methyl oleate had been added and the evolution of methanol had eased. To 24 grams (0.71 mole) of the product N-oleoyl-N-methylethanolamine which was isolated from the reaction mixture by the addition of a slight excess of glycolic acid followed by extraction with hexane, washing and stripping, was added 5.8 grams (0.74 mole) of acetyl chloride and 5.6 grams (0.71 mole) of pyridine. The reaction was carried out in 75 grams of benzene. After the reaction was complete the mixture was filtered, washed successively with dilute hydrochloric acid and water, and finally stripped to remove the benzene. Analysis of the product N-methyl-N-2-acetoxyethyl-oleamide: percent C, 71.25 (theory 72.33); percent H, 11.45 (theory 11.36); percent N, 3.71 (theory 3.67).

EXAMPLE 51

N-ethyl-N-2-acetoxyethyl-oleamide

This material was prepared by the procedure of Example 50, substituting N-ethylaminoethanol for N-methylaminoethanol. Analysis of the product, N-ethyl-N-2-acetoxyethyl-oleamide: percent C, 72.99 (theory 72.83); percent H, 11.39 (theory 11.38); percent N, 3.35 (theory 3.54).

EXAMPLE 52

N-isopropyl-N-2-acetoxyethyl-oleamide

This compound was prepared by the procedure of Example 50, substituting N-isopropylaminoethanol for N-methylaminoethanol. Analysis of the product, N-isopropyl-N-2-acetoxyethyl-oleamide; percent C, 73.91 (theory 73.35); percent H 11.92 (theory 11.49); perecnt N, 2.93 (theory 3.42).

EXAMPLE 53

N-butyl-N-2-acetoxyethyl-oleamide

This material was prepared by the procedure of Example 50, substituting N-butylaminoethanol for the N-methylaminoethanol. The isolated product, N-butyl-N-2-acetoxyethyl-oleamide, gave the following anaysis: percent C, 73.47 (theory 73.66); percent H, 11.63 (theory 11.66); percent N, 3.44 (theory 3.31).

EXAMPLE 54

N-ethyl-N-3-ethoxypropyl-oleamide

This compound was prepared by the procedure of Example 1, from 25 grams (0.19 mole) of N-(3-ethoxypropyl)ethylamine, 57.2 grams (0.19 mole) of oleoyl chloride, and 15.1 grams (0.19 mole) of pyridine. Analysis of the product, N-ethyl-N-3-ethoxypropyl-oleamide: percent C, 75.96 (theory 75.83); percent H, 12.67 (theory 12.48); percent N, 3.56 (theory 3.54).

EXAMPLE 55

N-cyclohexyl-N-2-acetoxyethyl-oleamide

This compound was prepared by the procedure of Example 50, substituting N-cyclohexylaminoethyl for N-methylaminoethanol. Analysis of the product, N-cyclohexyl-N-2-acetoxyethyl-oleamide: percent C, 74.65 (theory 74.73); percent H, 11.43 (theory 11.45); percent N, 3.30 (theory 3.12).

EXAMPLE 56

N-Cyclohexyl-N-2-cyanoethyl-oleamide

This compound was prepared by the procedure of Example 1, from 20.5 grams (0.13 mole) of N-(2-cyanoethyl)cyclohexylamine, 40 grams (0.13 mole) of oleoyl chloride and 10.2 grams (0.13 mole) of pyridine. Analysis of the product, N-cyclohexyl-N-2-cyanoethyl-oleamide: percent C, 78.08 (theory 77.00); percent H, 11.77 (theory 11.29); percent N, 6.90 (theory 7.19).

EXAMPLE 57

N-benyl-N-2-acetoxyethyl-oleamide

This compound was prepared by the procedure of Example 50, substituting N-benzylaminoethanol for N-methylaminoethanol. Analysis of the product N-benzyl-N-2-acetoxyethyl-oleamide: percent C, 75.67 (theory 76.15); percent H, 10.27 (theory 10.28); percent N, 2.88 (theory 3.06).

EXAMPLE 58

N,N-bis[2-(3-carbobutoxypropionyloxy)ethyl]-oleamide

To 37 grams (0.10 mole) of N,N-bis(2-hydroxyethyl) oleamide was added dropwise with stirring 46 grams (0.22 mole) of 3-chloroformylbutylpropionate in the presence of 20 grams (0.25 mole) of pyridine. After reacting for an additional hour the product was dissolved in hexane, filtered, washed successively with aqueous hydrochloric acid and water, and dried over anhydrous sodium sulfate. The solvent was removed by stripping under reduced pressure. Analysis of the product, N,N-bis[2-(3-carbobutoxypropionyloxy)ethyl]-oleamide: percent C, 67.90 (theory 66.90; percent H, 10.24 (theory 9.90); percent N, 2.08 (theory 2.06).

EXAMPLE 59

N,N-bis[2-(3-carbohexanoxypropionyloxy)ethyl] oleamide

This compound was prepared by the procedure of Example 58, from 36.9 grams (0.10 mole) of N,N-bis(2-hydroxyethyl)oleamide, 48 grams (0.22 mole) of 3-chloroformylhexylpropionate and 20 grams (0.25 mole) of pyridine. Analysis of the product, N,N-bis[2-(3-carbohexanoxypropionyloxy)ethyl]oleamide: percent C, 69.05 (theory 68.40); percent H, 10.32 (theory 10.19); percent N, 2.06 (theory 1.91).

EXAMPLE 60

N,N-di-n-butyl-2-(oleoxyloxy)propionamide 153.2 grams (1.19 mole) of di-n-butylamine and 70 grams (0.59 mole) of ethyl lactate were refluxed for 16 hours at a temperature just sufficient to liberate the ethanol formed. After the excess dibutylamine had been stripped under reduced pressure, the product N-lactoyldibutylamine was obtained by vacuum distillation, dissolving in ether and percolating through a column of activated alumina. The solvent was then removed by stripping under reduced pressure. To 30 grams (0.15 mole) of the product N-lactoyldibutylamine was added, 11.8 grams (0.15 mole) of pyridine, and 48.9 grams (0.16 mole) of oleoyl chloride. The reaction was carried out in 100 ml. of benzene. The reaction product was isolated from this mixture by filtration, followed by washing with dilute hydrochloric acid and water, and finally stripped to remove the benzene. Analysis of the product, N,N-di-n-butyl-2-(oleoyloxy)propionamide: percent C, 73.39 (theory 74.71); percent H, 11.78 (theory 11.81); percent N, 2.99 (theory 3.01).

Portions of the products prepared according to the Examples set forth above were evaluated as primary, solvent-type plasticizers for vinyl-type resins by the following procedures:

(1) Incorporating the plasticizer in a vinyl chloride-vinyl acetate copolymer (Vinylite VYDR) a copolymer consisting of 95% vinyl chloride and 5% vinyl acetate.
(2) Incorporating the plasticizer in a polyvinyl chloride homopolymer (Geon 101).

In either method, the following standard formulation is used, percent being by weight: 63.5% homopolymer (or copolymer), 35.0% plasticizer, 0.5% stearic acid, and, as stabilizer, 1.0% basic lead carbonate.

The formulation for each sample is then milled, molded, and then tested for: (a) tensile strength (p.s.i.); (b) 100% modulus (p.s.i.); (c) elongation (percent); (d) brittle point (° C.); (e) volatility loss in percent; and, (f) compatibility. Portions of the milled samples were tested for antistatic properties and for thermal stability.

The results of the above tests are then compared with control results obtained when a standard plasticizer such as di-2-ethylhexylphthalate (DOP) is used. These results are summarized in Tables I and II. Table I, C denotes compatibility and I denotes incompatibility as primary plasticizers in the proportions used. The sample was rated as incompatible if the molded stock showed any evidence of exudation or migration to the surface during a shelf storage of 30 days.

The antistatic properties of the plasticized resins were determined by the following procedure: A sheet of the milled plastic composition is stroked ten times in the same direction with unsoiled nylon fabric tautly draped over the bristles of a scrubbing brush and is then carefully placed so as to fully cover a ½-inch deep Petrie dish containing a layer of finely powdered cigar ashes. Those samples attracting and holding the greatest quantity of ash have poor antistatic properties and are given a rating of 4. Conversely those attracting no ash have excellent antistatic properties and are rated 0. Those rated 3, 2, and 1 are intermediate in antistatic effect. The nylon fabric is changed after each test. The ratings are reported in Table I.

TABLE I

| Ex. No. | Plasticizer | Tensile strength, p.s.i. | 100% modulus, p.s.i. | Elongation, percent | Brittle point, °C. | Volatility loss, percent | Compatibility [a] | Antistatic rating [b] |
|---|---|---|---|---|---|---|---|---|
| 1 | N,N-di-n-propyl-oleamide | 2,600 | 1,270 | 370 | −61 | 0.77 | C | 0 |
| 2 | N,N-di-isopropyl-oleamide | 2,960 | 1,660 | 330 | −53 | 2.49 | C | 0 |
| 3 | N,N-di-n-butyl-oleamide | 2,710 | 1,470 | 335 | −63 | 1.27 | C | 0 |
| 3a | N,N-di-n-butyl-oleamide [c] | 2,640 | 1,520 | 300 | −59 | 1.07 | C | |
| 4 | N,N-di-sec-butyl-oleamide | 2,650 | 1,720 | 320 | −53 | 2.51 | C | 0 |
| 5 | N,N-di-isobutyl-oleamide | 2,730 | 1,540 | 310 | −55 | 2.64 | C | 0 |
| 6 | N,N-di-n-amyl-oleamide | 2,680 | 1,500 | 330 | −61 | 0.67 | C | 0 |
| 7 | N,N-di-isoamyl-oleamide | 3,180 | 1,540 | 340 | −59 | 1.08 | C | 0 |
| 8 | N,N-di-2-amyl-oleamide | 1,970 | 1,780 | 160 | −33 | | C | |
| 9 | N,N-di-n-hexyl-oleamide | 2,506 | 1,630 | 280 | −63 | 0.27 | C | 0 |
| 10 | N,N-di-n-heptyl-oleamide | 1,460 | | 120 | −33 | 0.84 | C | 0 |
| 11 | N,N-di-n-octyl-oleamide | | Would not mill | | | | I | |
| 12 | N,N-di-2-ethylhexyl-oleamide | | Would not mill | | | | I | |
| 13 | N,N-di-n-decyl-oleamide | | Would not mill | | | | I | |
| 14 | N,N-di-n-butyl-2-ethylhexanamide | 2,610 | 1,180 | 350 | −41 | 10.21 | C | [d] 4 |
| 15 | N,N-di-n-butyl-neodecanamide | 2,980 | 1,570 | 340 | −27 | 10.36 | C | [d] 4 |
| 16 | N,N-di-n-butyl-neotridecanamide | 2,790 | 2,100 | 330 | −23 | 9.66 | C | 4 |
| 17 | N,N-di-n-butyl-palmitamide | 2,730 | 1,360 | 350 | −47 | 0.66 | C | 0 |
| 18 | N,N-di-n-butyl-stearamide | 2,540 | 1,540 | 340 | −37 | 0.93 | I | |
| 19 | N,N-di-n-butyl-erucamide | 2,380 | 1,620 | 250 | −57 | 0.28 | C | 0 |
| 20 | N,N-di-n-butyl-epoxystearamide | 2,800 | 1,190 | 360 | −35 | 0.46 | C | |
| 21 | N,N-di-n-butyl-linoleamide | 2,760 | 1,340 | 350 | −57 | 2.23 | I | |
| 22 | N,N-di-n-butyl-ricinoleamide | | Immediate bleeding | | | | I | |
| 23 | N,N-di-n-butyl-naphthenamide | 2,970 | 1,610 | 300 | −21 | 8.32 | C | [d] 3 |
| 24 | N,N,N'-tetra-n-butyl diamide of dimeric linoleic acid | 2,950 | 2,180 | 230 | −23 | 0.00 | C | [d] 4 |
| 25 | Ethyl 2,2-dimethyl-3(di-n-butylamino)-carbonyl-cyclobutaneacetate | 3,060 | 1,460 | 300 | −7 | 5.16 | C | [d] 4 |
| 26 | N,N-di-n-butylamide of cottonseed fatty acids | 2,840 | 1,310 | 400 | −57 | 2.38 | I | 0 |
| 27 | N,N-di-n-butyl amide of selectively hydrogenated cottonseed fatty acids | 2,630 | 1,420 | 350 | −57 | 1.11 | C | 0 |
| 28 | N,N-di-n-butyl amide of rapeseed fatty acids | 2,740 | 1,650 | 290 | −57 | 0.39 | I | 0 |
| 29 | N,N-di-n-butyl amide of *Limnanthes douglasii* fatty acids | 2,560 | 1,520 | 330 | −53 | 0.91 | C | 0 |
| 30 | N,N-di-n-butyl amide of animal acids | 2,600 | 1,470 | 330 | −51 | 0.62 | C | 0 |
| 31 | N,N-di-n-butyl amide of parsley seed fatty acids | 2,810 | 1,450 | 350 | −57 | 2.61 | C | 0 |
| 32 | N-methyl-N-propyl-oleamide | 2,510 | 1,140 | 380 | −59 | 2.29 | C | |
| 33 | N-methyl-N-n-butyl-oleamide | 2,620 | 1,250 | 350 | −61 | 1.38 | C | 0 |
| 34 | N-methyl-N-n-amyl-oleamide | 2,540 | 1,150 | 370 | −61 | 1.46 | C | |
| 35 | N-methyl-N-n-hexyl-oleamide | 2,560 | 1,290 | 370 | −65 | 1.65 | C | 0 |
| 36 | N-methyl-N-n-octyl-oleamide | 2,700 | 1,400 | 380 | −63 | 1.07 | C | |
| 37 | N-methyl-N-n-dodecyl-oleamide | 2,300 | 1,590 | 260 | −53 | 0.92 | C | |
| 38 | N-methyl-N-allyl-oleamide | 2,380 | 1,130 | 310 | −61 | | C | |
| 9 | N-n-butyl-N-n-dodecyl-dodecyl-oleamide | | Would not mill | | | | I | |
| 40 | N-n-butyl-N-n-propyl-oleamide | 2,650 | 1,340 | 390 | −61 | 0.72 | C | 0 |
| 41 | N-n-butyl-N-n-amyl-oleamide | 2,710 | 1,540 | 320 | −61 | 0.60 | C | 0 |
| 42 | N-methyl-N-cyclopentyl-oleamide | 2,810 | 1,500 | 360 | −41 | 0.74 | C | 0 |
| 43 | N-ethyl-N-cyclohexyl-oleamide | 2,820 | 1,460 | 350 | −37 | 0.68 | C | |
| 44 | N-isopropyl-N-cyclohexyl-oleamide | 2,960 | 1,850 | 310 | −39 | 0.73 | C | 4 |
| 45 | N-methyl-N-cyclooctyl-oleamide | 2,700 | 1,540 | 320 | −39 | 0.20 | C | 0 |
| 46 | N-methyl-N-cyclododecyl-oleamide | 3,060 | 2,090 | 340 | −33 | | C | |
| 47 | N-isopropyl-N-benzyl-oleamide | 3,000 | 1,690 | 340 | −35 | 0.58 | C | 4 |
| 48 | N-methyl-N-furfuryl-oleamide | 2,700 | 1,370 | 370 | −51 | 1.00 | C | |
| 49 | N-methyl-N-tetrahydrofurfuryl-oleamide | 2,900 | 1,320 | 350 | −41 | 0.70 | C | |
| 50 | N-methyl-N-2-acetoxyethyl-oleamide | 2,830 | 1,310 | 380 | −43 | | C | |
| 51 | N-ethyl-N-2-acetoxyethyl-oleamide | 2,610 | 1,300 | 315 | −45 | 1.48 | C | 0 |
| 52 | N-isopropyl-N-2-acetoxyethyl-oleamide | 2,560 | 1,700 | 270 | −37 | 1.46 | I | 0 |
| 53 | N-n-butyl-N-2-acetoxyethyl-oleamide | 2,860 | 1,330 | 360 | −45 | 0.36 | C | 0 |
| 54 | N-ethyl-N-3-ethoxypropyl-oleamide | 2,580 | 1,250 | 360 | −57 | 1.11 | C | 0 |
| 55 | N-cyclohexyl-N-2-acetoxyethyl-oleamide | 3,180 | 1,780 | 380 | −31 | 0.36 | C | |
| 56 | N-cyclohexyl-N-2-cyanoethyl-oleamide | 3,030 | 1,710 | 410 | −25 | 0.46 | C | [d] 4 |
| 57 | N-benzyl-N-2-acetoxyethyl-oleamide | 3,060 | 1,790 | 400 | −33 | 0.79 | C | 0 |
| 58 | N,N-bis[2-(3-carbobutoxypropionyloxy)ethyl]-oleamide | 3,110 | 1,950 | 390 | −33 | 0.87 | I | |
| 59 | N,N-bis[2-(3-carbohexanoxypropionyloxy)ethyl]-oleamide | 3,040 | 2,010 | 310 | −35 | 1.19 | C | |
| 60 | N,N-di-n-butyl-2-(oleoyloxy)propionamide | 3,020 | 1,730 | 360 | −39 | 1.14 | C | |
| | Di-2-ethylhexylphthalate (control) | 3,050 | 1,610 | 330 | −33 | 1.50 | C | 4 |

[a] C=compatible, I=incompatible.
[b] Ratings from 0 (excellent antistatic properties) to 4 (no antistatic properties).
[c] Same as Example 3 using polyvinyl chloride homopolymer instead of copolymer resin (Vinylite VYDR).
[d] A rating of zero was obtained for each of these plasticized resin samples after a very thin film of the specific plasticizer used as plasticizer had been applied to the surface of the plasticized resin.

The relative thermal stabilities of the plasticized compositions were determined by the following test procedure: A 3 x 4-inch sheet of the milled plasticized composition, 10 to 15 mils in thickness, is laid on alumina foil and subjected to a temperature of 176° C. in a forced draft oven for incremental exposure periods of 30 minutes. Every thirty minutes the specimen is removed from the oven, cooled, and placed on a standard white background. The reflectance is then determined by means of a photoelectric reflectometer (we used Model No. 610 of the Photovolt Corp.) employing the amber 0°, 45° directional reflectance. The loss in reflectance is a measure of degree of discoloration. The results, given in Table II, show, the loss in reflectance expressed as "percent of original reflectance" of the untreated sample. Compositions retaining the greatest percentage of their initial reflectance value, i.e., those exhibiting the smallest reflectance loss for a given exposure period, have the greatest thermal stability.

The improved thermal stability of the polyvinyl chloride resin plasticized with N,N-n-dibutyl olemide over that with N,N-dimethyl oleamide is shown more emphatically when a highly efficient but much more expensive stabilizer formulation is used instead of basic lead carbonate, as shown by the thermal stability data in Table III for a plastic composition of the following formulation, percent being by weight: 62.7% Vinylite VYDR plasticizer, 0.5% stearic acid, 2% polymeric dibutyl tin mercaptide (Avastab T360), and 0.2% alkylarylphosphite (Avastab CH300).

TABLE III

| Ex. No. | Plasticizer | Percent loss in reflectance after— | | | | | | | |
|---|---|---|---|---|---|---|---|---|---|
| | | 0 min. | 30 min. | 60 min. | 90 min. | 120 min. | 150 min. | 180 min. | 210 min. |
| | N,N-dimethyl-oleamide | 0.0 | 5.2 | 10.9 | 25.0 | 43.0 | 84.7 | 95.6 | 95.8 |
| 1 | N,N-di-n-propyl-oleamide | 0.0 | 0.2 | 1.3 | 2.6 | 6.5 | 18.1 | 54.5 | 95.5 |
| 3 | N,N-di-n-butyl-oleamide | 0.0 | 0.0 | 0.0 | 0.0 | 0.0 | 2.7 | 13.8 | 28.4 |

We claim:
1. An N-alkyl-N-2-acetoxyethyl-oleamide wherein the alkyl group contains from 1–4 carbon atoms.
2. N-methyl-N-2-acetoxyethyl-oleamide.
3. N-ethyl-N-2-acetoxyethyl-oleamide.
4. N-isopropyl-N-2-acetoxyethyl-oleamide.
5. N-n-butyl-N-2-acetoxyethyl-oleamide.

TABLE II

| Ex. No. | Plasticizer | Percent loss in reflectance after— | | | | | |
|---|---|---|---|---|---|---|---|
| | | 0 min. | 30 min. | 60 min. | 90 min. | 120 min. | 150 min. |
| | N,N-dimethyl-oleamide [a] | 0.0 | 61.7 | 74.8 | 97.3 | | |
| 3 | N,N-di-n-butyl-oleamide | 0.0 | 8.9 | 36.4 | 53.2 | 67.6 | 94.2 |
| 5 | N,N-diisobutyl-oleamide | 0.0 | 18.9 | 36.9 | 68.3 | 95.6 | |
| 6 | N,N-di-n-amyl-oleamide | 0.0 | 19.5 | 34.9 | 62.1 | 92.1 | |
| 9 | N,N-di-n-hexyl-oleamide | 0.0 | 9.1 | 36.0 | 55.8 | 88.6 | |
| 33 | N-methyl-N-n-butyl-oleamide | 0.0 | 49.3 | 69.1 | 96.1 | | |
| 35 | N-methyl-N-n-hexyl-oleamide | 0.0 | 46.6 | 51.6 | 77.0 | 96.3 | |
| 50 | N-methyl-N-2-acetoxyethyl-oleamide | 0.0 | 48.9 | 53.9 | 78.9 | 93.9 | |
| 43 | N-ethyl-N-cyclohexyl-oleamide | 0.0 | 30.2 | 51.9 | 75.2 | 95.8 | |
| 49 | N-methyl-N-tetrahydrofurfuryl-oleamide | 0.0 | 38.8 | 65.0 | 97.2 | | |
| 17 | N,N-di-n-butyl-palmitamide | 0.0 | 15.0 | 61.0 | 95.5 | | |
| 24 | N,N,N',N'-tetra-n-butyl diamide of dimerized linoleic acid | 0.0 | 37.2 | 47.2 | 95.8 | | |
| 54 | N-ethyl-N-3-ethoxypropyl-oleamide | 0.0 | 29.7 | 53.6 | 74.2 | 97.4 | |
| 60 | N,N-di-n-butyl-2-(oleoyloxy)propionamide | 0.0 | 27.2 | 39.1 | 69.6 | 91.5 | |
| 20 | N,N-di-n-butyl-epoxystearamide | 0.0 | 23.8 | 24.2 | 36.6 | 50.7 | |
| | DOP [b] (Control) | 0.0 | 0.0 | 12.2 | 72.7 | 76.8 | 82.6 |

[a] Commercial product.
[b] Di-2-ethylhexyl phthalate.

References Cited

UNITED STATES PATENTS

| | | | |
|---|---|---|---|
| 3,024,260 | 3/1962 | Ernst | 260—404 |
| 3,179,615 | 4/1965 | Magne et al. | 260—30.4 |
| 2,817,672 | 12/1957 | Fein et al. | 260—404 |
| 2,773,852 | 12/1956 | Rowe et al. | 260—404 X |
| 3,309,333 | 3/1967 | Mod et al. | 260—404 X |
| 3,704,257 | 11/1972 | Mod et al. | 260—404.5 |

FOREIGN PATENTS

| | | | |
|---|---|---|---|
| 184,873 | 9/1936 | Switzerland | 260—404 |

OTHER REFERENCES

Magne et al.: J.A.O.C.S., October 1963, vol. 40, No. 10, pp. 541–5.

LEWIS GOTTS, Primary Examiner

E. G. LOVE, Assistant Examiner

U.S. Cl. X.R.

260—557

PO-1050
(5/69)

UNITED STATES PATENT OFFICE
CERTIFICATE OF CORRECTION

Patent No. 3,787,455      Dated January 22, 1974

Inventor(s) Robert R. Mod, Frank C. Magne and Evald L. Skau

It is certified that error appears in the above-identified patent and that said Letters Patent are hereby corrected as shown below:

The title in the above patent should read as follows:

- N-alkyl-N-2-Acetoxyethyl-Oleamides -.

The abstract of the invention should read as follows:

- The invention provides N-alkyl-N-2-acetoxyethyl-oleamides wherein the alkyl group contains from 1-4 carbon atoms, which are useful as plasticizers for vinyl chloride resins. -.

The specification should be corrected as the following places:

Page 7, line 9, cancel "com".

Page 35, Table 1, Example 39 cancel "dodecyl" (first occurrence).

Example 44, cancel "oleamice" and insert - oleamide -.

Signed and sealed this 1st day of October 1974.

(SEAL)
Attest:

McCOY M. GIBSON JR.
Attesting Officer

C. MARSHALL DANN
Commissioner of Paten